United States Patent
Zhang et al.

(10) Patent No.: US 12,336,029 B2
(45) Date of Patent: Jun. 17, 2025

(54) COMMUNICATION METHOD AND APPARATUS FOR ACTIVATING SECONDARY CELL

(71) Applicant: HUAWEI TECHNOLOGIES CO., LTD., Shenzhen (CN)

(72) Inventors: Li Zhang, Beijing (CN); Jing Han, Beijing (CN); Jiantao Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 17/704,528

(22) Filed: Mar. 25, 2022

(65) Prior Publication Data
US 2022/0217800 A1 Jul. 7, 2022

Related U.S. Application Data

(63) Continuation of application No. PCT/CN2019/108172, filed on Sep. 26, 2019.

(51) Int. Cl.
*H04W 76/15* (2018.01)
*H04L 5/00* (2006.01)

(52) U.S. Cl.
CPC .......... *H04W 76/15* (2018.02); *H04L 5/0048* (2013.01)

(58) Field of Classification Search
CPC ....... H04L 5/001; H04L 5/0048; H04W 76/15
See application file for complete search history.

(56) References Cited

U.S. PATENT DOCUMENTS

| 2015/0215729 | A1* | 7/2015 | Opshaug | H04W 4/02 455/456.1 |
| 2016/0198439 | A1* | 7/2016 | Dalsgaard | H04L 5/006 370/329 |
| 2018/0007731 | A1  | 1/2018 | Park et al. | |
| 2021/0068129 | A1* | 3/2021 | Ryu | H04W 80/02 |

FOREIGN PATENT DOCUMENTS

| CN | 102958045 A | 3/2013 |
| CN | 109391986 A | 2/2019 |
| CN | 110149178 A | 8/2019 |

OTHER PUBLICATIONS

Vivo: "Efficient Scell activation", 3GPP Draft; R1-1906184,May 13, 2019, XP051727638, total 4 pages.

(Continued)

*Primary Examiner* — Mansour Oveissi
(74) *Attorney, Agent, or Firm* — HAUPTMAN HAM, LLP

(57) ABSTRACT

This application discloses a communication method and apparatus that activate a secondary cell. If the activated cell is an unknown secondary cell, in response to a terminal device detecting the secondary cell, the terminal device may send indication information to a network device. The indication information is used to trigger the network device to send an RS. In this way, in response to receiving the indication information, the network device may send the RS to the terminal device. Therefore, the terminal device avoids waiting a long period of time for the network device to send a reference signal, which can reduce a delay for activating the secondary cell.

20 Claims, 7 Drawing Sheets

(56) References Cited

OTHER PUBLICATIONS

LG Electronics Inc: "Potential solutions for fast SCell activation", 3GPP Draft; R2-1911006, Aug. 16, 2019, XP051768768, total 4 pages.
Huawei et al: "Initial discussion on fast cell access", 3GPP Draft; R4-1909670, Aug. 16, 2019, XP051772541, total 5 pages.
Extended European Search Report issued in corresponding European Application No. 19946677.2, dated Sep. 1, 2022, pp. 1-10.
Catt, Small cell activation and deactivation. 3GPP TSG RAN WG2 Meeting #84, San Francisco, USA, Nov. 11-15, 2013, R2-134060, 2 pages.
Huawei, HiSilicon, Discussion on SCell activation and deactivation. 3GPP TSG RAN WG1 Meeting #97, Reno, USA, May 13-17, 2019, R1-1906018, 11 pages.
ZTE Corporation, Sanechips, On Directly Configuring SCell as Activated. 3GPP TSG-RAN WG2 Meeting #107bis, Chongqing, China, Sep. 14-18, 2019, R2-1913489, 3 pages.
Qualcomm Incorporated, Fast SCG and SCell Activation. 3GPP TSG-RAN WG1 #97, Reno, USA, May 13-17, 2019, R1-1907306, 11 pages.
International Search Report issued in corresponding International Application No. PCT/CN2019/108172, dated May 27, 2020, pp. 1-9.

\* cited by examiner

COMMUNICATION METHOD AND APPARATUS FOR ACTIVATING SECONDARY CELL

CROSS-REFERENCE TO RELATED APPLICATIONS

This application is a continuation of International Application No. PCT/CN2019/108172, filed on Sep. 26, 2019, the disclosure of which is hereby incorporated by reference in its entirety.

TECHNICAL FIELD

This application relates to the communication field, and more specifically, to a communication method and apparatus, in the communication field, for activating a secondary cell.

BACKGROUND

A terminal device may simultaneously use a plurality of cells for uplink and downlink communication, to support high-speed data transmission. One cell in the plurality of cells is a primary cell (primary cell, PCell), and other cells are secondary cells (secondary cell, SCell). In this way, carrier aggregation (carrier aggregation, CA) can be implemented in the plurality of cells. In a CA process, the terminal device needs to activate the secondary cell, and cells that need to be activated are classified into a known secondary cell and an unknown secondary cell. A process in which the terminal device activates the cell depends on a reference signal (reference signal, RS) sent by a network device. Because a period in which the network device sends the RS is long (For example, when the RS is a synchronization signal/physical broadcast channel block (synchronization signal/physical broadcast channel block, SSB), a period in which the SSB is set is usually greater than or equal to 20 milliseconds), a delay of activating the secondary cell by the terminal device is large. As a result, the terminal device cannot promptly use a bandwidth resource of the secondary cell, and user experience is poor.

SUMMARY

This application provides a communication method and apparatus for activating a secondary cell, to reduce a delay of activating the secondary cell. This helps improve timeliness of using a bandwidth resource of the secondary cell by a terminal device, and improve user experience.

According to a first aspect, a communication method for activating a secondary cell is provided, including: After detecting a secondary cell, a terminal device sends indication information to a network device. The terminal device receives an RS sent by the network device, where the RS is sent by the network device in response to the indication information. The terminal device activates the secondary cell based on the RS.

In this embodiment of this application, if the activated cell is an unknown secondary cell, the terminal device needs to first detect the secondary cell, to obtain coarse timing information of the secondary cell. Time at which the terminal device completes secondary cell detection is not fixed, but is determined based on conditions such as an implementation of the terminal device and a channel state. The terminal device may perform secondary cell detection based on an SSB, and may receive another reference signal sent by the network device by using the secondary cell only after the secondary cell detection is completed. Therefore, if the activated cell is the unknown secondary cell, the network device does not know when to send the RS to the terminal device. If the network device sends the RS to the terminal device prematurely, and the terminal device has not detected the secondary cell, a waste of reference signal overheads is caused. If the network device sends the RS to the terminal device late, a delay of activating the secondary cell by the terminal device increases. Therefore, if the activated cell is the unknown secondary cell, after the terminal device detects the secondary cell, the terminal device may send the indication information to the network device. The indication information is used to trigger the network device to send the RS by using the secondary cell. In this way, after receiving the indication information, the network device may send the RS to the terminal device. Therefore, this can avoid a case in which the terminal device waits for the network device to send a reference signal with a long period, and this helps reduce the delay of activating the secondary cell. The terminal device can quickly use a bandwidth resource of the secondary cell. This improves user experience.

Optionally, the terminal device sends the indication information to the network device by using a primary cell.

Optionally, the indication information sent by the terminal device to the network device may carry an identifier of the secondary cell.

With reference to the first aspect, in a possible implementation of the first aspect, that a terminal device sends indication information to a network device includes: The terminal device sends the indication information to the network device on a first sending occasion after detecting the secondary cell, where the first sending occasion after the secondary cell is detected is not later than a first sending occasion after a time threshold for detecting the secondary cell. The time at which the terminal device completes the secondary cell detection is not fixed, but is determined based on the conditions such as the implementation of the terminal device and the channel state. Therefore, each terminal device detects the secondary cell at different time, and each terminal device needs to send indication information to the network device on a first sending occasion after the terminal device detects the secondary cell. The first sending occasion for sending the indication information is not later than a first sending occasion after the time threshold, for detecting the secondary cell, configured by the network device for the terminal device (The time threshold is a general time threshold configured by the network device for the terminal device for detecting the secondary cell. After the time threshold is exceeded, the secondary cell cannot be detected. Each terminal device may detect the secondary cell in a time interval less than the time threshold). In other words, the solutions in this embodiment of this application relate to two first sending occasions. The first sending occasion after the secondary cell is detected is before the first sending occasion after the time threshold for detecting the secondary cell, and does not exceed the first sending occasion after the time threshold for detecting the secondary cell at least. In this way, this can avoid a case in which the terminal device does not send the indication information after detecting the secondary cell, and this helps the terminal device that can quickly complete the secondary cell detection send the indication information promptly. This ensures that the network device quickly detects the indication information, and triggers the network device to send the RS. This helps reduce a delay of sending the RS.

With reference to the first aspect, in a possible implementation of the first aspect, the method further includes: The terminal device receives first configuration information sent by the network device, where the first configuration information is used to indicate a first resource for sending the indication information. That a terminal device sends indication information to a network device includes: sending the indication information to the network device by using the first resource indicated by the first configuration information.

Because the terminal device needs a resource for sending physical layer information, the network device needs to configure a physical layer resource for sending the indication information by the terminal device. In this way, the terminal device may send the indication information to the network device by using the first resource, to avoid a case in which the indication information fails to be sent because the terminal device cannot send the indication information or the network device does not know a physical layer resource for sending the indication information by the terminal device. The first resource may be a physical layer resource in the primary cell or the secondary cell. The first resource may be a scheduling request (scheduling request, SR) resource, a physical random access channel (physical random access channel, PRACH) resource, or a new physical layer resource. This helps distinguish between the resource for sending the indication information by the terminal device and a resource for reporting L1-RSRP by the terminal device.

With reference to the first aspect, in a possible implementation of the first aspect, the first resource indicated by the first configuration information is the resource for reporting the layer 1 reference signal received power L1-RSRP by the terminal device.

Therefore, the terminal device may reuse the resource to report the L1-RSRP for the secondary cell. In this way, an additional resource does not need to be occupied to send the indication information, so that resource overheads are reduced. In addition, this can also avoid overheads caused when the network device needs to configure, for the terminal device, a dedicated resource for sending the indication information.

With reference to the first aspect, in a possible implementation of the first aspect, the indication information is used to indicate a synchronization signal/physical broadcast channel block SSB index corresponding to a transmit beam of the network device, and a quantity of SSB indexes is one.

In this way, the terminal device reports only one SSB index, and when sending the RS by using the secondary cell in response to the indication information, the network device may send the RS to the terminal device by using a transmit beam corresponding to the SSB index. In this way, the terminal device may learn the transmit beam (or QCL information) for sending the RS, without the network device sending additional beam indication information to indicate the transmit beam of the network device to the terminal device (The transmit beam indication information is used to indicate a transmit beam used when the network device sends data or an RS to the terminal device. For example, the transmit beam indication information may be transmission configuration indicator (transmission configuration indicator, TCI) information).

With reference to the first aspect, in a possible implementation of the first aspect, the terminal device expects that the RS and an SSB corresponding to the SSB index indicated by the indication information are quasi co-located QCL.

In other words, the indication information is used to indicate the SSB index corresponding to the transmit beam of the network device. The terminal device determines, in a cell detection process, a receive beam of the SSB corresponding to the SSB index. The terminal device may receive, by using the receive beam, the RS sent by the network device by using the transmit beam corresponding to the SSB index. In this way, a case in which the terminal device determines the receive beam of the RS by receiving the transmit beam indication information of the network device is avoided. This reduces signaling interaction in a secondary cell activation process, and therefore this reduces the delay of activating the secondary cell.

With reference to the first aspect, in a possible implementation of the first aspect, the RS includes the SSB, and that the terminal device receives an RS sent by the network device includes: The terminal device receives the SSB corresponding to the SSB index sent by the network device. In other words, the terminal device may learn that the SSB sent by the network device is an SSB corresponding to an SSB index reported by the terminal device. The network device sends, to the terminal device, only the SSB corresponding to the SSB index reported by the terminal device, so that this can avoid overheads caused by additional sending of all SSBs by the network device to the terminal device to enable the terminal device to activate the secondary cell.

With reference to the first aspect, in a possible implementation of the first aspect, the RS includes a tracking reference signal TRS. In this way, the terminal device may activate the secondary cell by using the TRS.

With reference to the first aspect, in a possible implementation of the first aspect, the RS includes a channel state information CSI-reference signal RS. In this way, the terminal device may measure CSI by using the CSI-RS, and report the CSI to the network device. After the terminal device reports the CSI to the network device, the network device may learn that activation of the secondary cell by the terminal device ends, and the network device may stop sending the RS used to activate the secondary cell. This reduces signaling overheads.

With reference to the first aspect, in a possible implementation of the first aspect, the method further includes: The terminal device receives second configuration information sent by the network device, where the second configuration information is used to indicate a period and/or a quantity of times of sending the RS by the network device. That the terminal device receives an RS sent by the network device by using the secondary cell includes: The terminal device receives, based on the period and/or the quantity of times indicated by the second configuration information, the RS sent by the network device by using the secondary cell.

In the activation process, the terminal device may need to receive the RS for a plurality of times to complete the activation, and the terminal device needs to learn a time domain location at which the RS appears each time. In this way, the terminal device may receive, based on the period and/or the quantity of times indicated by the second configuration information, the RS sent by the network device. This can effectively avoid a case in which the terminal device cannot receive the RS that is periodically or semi-persistently sent.

According to a second aspect, a communication method for activating a secondary cell is provided, including: A network device receives indication information sent by a terminal device. The network device sends a reference signal RS to the terminal device by using a secondary cell in response to the indication information.

In this embodiment of this application, if the activated cell is an unknown secondary cell, the terminal device needs to first detect the secondary cell, to obtain coarse timing information of the secondary cell. Time at which the terminal device completes secondary cell detection is not fixed, but is determined based on conditions such as an implementation of the terminal device and a channel state. The terminal device may perform secondary cell detection based on an SSB, and may receive another reference signal sent by the network device by using the secondary cell only after the secondary cell detection is completed. Therefore, if the activated cell is the unknown secondary cell, the network device does not know when to send the RS to the terminal device. If the network device sends the RS to the terminal device prematurely, and the terminal device has not detected the secondary cell, a waste of reference signal overheads is caused. If the network device sends the RS to the terminal device late, a delay of activating the secondary cell by the terminal device increases. Therefore, if the activated cell is the unknown secondary cell, the network device may receive the indication information sent by the terminal device. The indication information is used to trigger the network device to send the RS. In this way, after receiving the indication information, the network device may send the RS to the terminal device. Therefore, this can avoid a case in which the terminal device waits for the network device to send a reference signal with a long period, and this helps reduce the delay of activating the secondary cell. The terminal device can quickly use a bandwidth resource of the secondary cell. This improves user experience.

Optionally, the terminal device sends the indication information to the network device after detecting the secondary cell.

With reference to the second aspect, in a possible implementation of the second aspect, the method further includes: The network device sends first configuration information to the terminal device, where the first configuration information is used to indicate a first resource for sending the indication information by the terminal device. That a network device receives indication information sent by a terminal device includes: The network device receives, on the first resource, the indication information sent by the terminal device.

Because the terminal device needs a resource for sending physical layer information, the network device needs to configure a physical layer resource for sending the indication information by the terminal device. In this way, the network device may receive, on the first resource, the indication information sent by the terminal device, to avoid a case in which the indication information fails to be sent because the network device does not know a physical layer resource for sending the indication information by the terminal device and a resource for receiving the indication information by the network device. The first resource may be a physical layer resource in a primary cell or the secondary cell. For example, the first resource is an SR resource, a PRACH resource, or a new physical resource. This helps distinguish between the resource for sending the indication information by the terminal device and a resource for reporting L1-RSRP by the terminal device.

With reference to the second aspect, in a possible implementation of the second aspect, the first resource indicated by the first configuration information is the resource for reporting the layer 1 reference signal received power L1-RSRP by the terminal device.

Therefore, the terminal device may reuse the resource to report the L1-RSRP for the secondary cell. In this way, an additional resource does not need to be occupied to send the indication information, so that resource overheads are reduced. In addition, this can also avoid overheads caused when the network device needs to configure, for the terminal device, a dedicated resource for sending the indication information.

With reference to the second aspect, in a possible implementation of the second aspect, the indication information is used to indicate a synchronization signal/physical broadcast channel block SSB index corresponding to a transmit beam of the network device, and a quantity of SSB indexes is one.

In this way, when sending the RS by using the secondary cell in response to the indication information, the network device may send the RS to the terminal device by using the transmit beam corresponding to the SSB index. In this way, the terminal device may learn the transmit beam (or QCL information) for sending the RS, without the network device sending additional beam indication information to indicate the transmit beam of the network device to the terminal device (The transmit beam indication information is used to indicate a transmit beam used when the network device sends data or an RS to the terminal device. For example, the transmit beam indication information may be a TCI).

With reference to the second aspect, in a possible implementation of the second aspect, the network device ensures that the RS and an SSB corresponding to the SSB index indicated by the indication information are quasi co-located QCL.

In other words, the indication information is used to indicate the SSB index corresponding to the transmit beam of the network device. The terminal device determines, in a cell detection process, a receive beam of the SSB corresponding to the SSB index. The terminal device may receive, by using the receive beam, the RS sent by the network device by using the transmit beam corresponding to the SSB index. In this way, a case in which the terminal device determines the receive beam of the RS by receiving the transmit beam indication information of the network device is avoided. This reduces signaling interaction in a secondary cell activation process, and therefore this reduces the delay of activating the secondary cell.

With reference to the second aspect, in a possible implementation of the second aspect, the RS includes the SSB, and that the network device sends an RS to the terminal device by using a secondary cell in response to the indication information includes: The network device sends, to the terminal device by using the secondary cell in response to the indication information, the SSB corresponding to the SSB index indicated by the indication information. In other words, the terminal device may learn that the SSB sent by the network device is an SSB corresponding to an SSB index reported by the terminal device. The network device sends, to the terminal device, only the SSB corresponding to the SSB index reported by the terminal device, so that this can avoid reference signal overheads caused by activating, by the network device for the secondary cell of the terminal device, all SSBs that are additionally sent.

With reference to the second aspect, in a possible implementation of the second aspect, the RS includes a tracking reference signal TRS. In this way, the terminal device may activate the secondary cell by using the TRS. In this way, the terminal device may measure CSI by using the CSI-RS, and report the CSI to the network device. After the terminal device reports the CSI to the network device, the network device may learn that activation of the secondary cell by the terminal device ends, and the network device may stop sending the RS used to activate the secondary cell. This reduces signaling overheads.

With reference to the second aspect, in a possible implementation of the second aspect, the RS further includes a channel state information CSI-reference signal RS.

With reference to the second aspect, in a possible implementation of the second aspect, the method further includes: The network device sends second configuration information to the terminal device, where the second configuration information is used to indicate a period and/or a quantity of times of sending the RS. That the network device sends an RS to the terminal device by using a secondary cell in response to the indication information includes: The network device sends, in response to the indication information, the RS to the terminal device by using the secondary cell based on the period and/or the quantity of times indicated by the second configuration information.

In an activation process, the terminal device may need to receive the RS for a plurality of times to complete activation, and the terminal device needs to learn a time domain location at which the RS appears each time. In this way, the network device may send the RS to the terminal device based on the period and/or the quantity of times indicated by the second configuration information, and the terminal device receives, based on the period and/or the quantity of times indicated by the second configuration information, the RS sent by the network device. This can effectively avoid a case in which the terminal device cannot receive the RS that is periodically or semi-persistently sent.

According to a third aspect, an apparatus for activating a secondary cell is provided. The apparatus is configured to perform the method according to any one of the first aspect or the possible implementations of the first aspect. Specifically, the apparatus may include a module configured to perform the method according to any one of the first aspect or the possible implementations of the first aspect.

According to a fourth aspect, an apparatus for activating a secondary cell is provided. The apparatus is configured to perform the method according to any one of the second aspect or the possible implementations of the second aspect. Specifically, the apparatus may include a module configured to perform the method according to any one of the second aspect or the possible implementations of the second aspect.

According to a fifth aspect, an apparatus for activating a secondary cell is provided. The apparatus includes a memory and a processor. The memory is configured to store instructions, the processor is configured to execute the instructions stored in the memory, and execution of the instructions stored in the memory enables the processor to perform the method according to any one of the first aspect or the possible implementations of the first aspect.

According to a sixth aspect, an apparatus for activating a secondary cell is provided. The apparatus includes a memory and a processor. The memory is configured to store instructions, the processor is configured to execute the instructions stored in the memory, and execution of the instructions stored in the memory enables the processor to perform the method according to any one of the second aspect or the possible implementations of the second aspect.

According to a seventh aspect, this application provides a system for activating a secondary cell, where the system includes the apparatus according to the third aspect and the apparatus according to the fourth aspect.

Alternatively, the system includes the apparatus according to the fifth aspect and the apparatus according to the sixth aspect.

According to an eighth aspect, this application provides a computer-readable storage medium. The computer-readable storage medium stores computer instructions. When the computer instructions are run on a computer, the computer is enabled to perform the method according to any one of the first aspect and the possible designs of the first aspect.

According to a ninth aspect, this application provides a computer-readable storage medium. The computer-readable storage medium stores computer instructions. When the computer instructions are run on a computer, the computer is enabled to perform the method according to any one of the second aspect and the possible designs of the second aspect.

According to a tenth aspect, this application provides a chip, including a processor. The processor is configured to read and execute a computer program stored in a memory, to perform the method according to any one of the first aspect or the possible implementations of the first aspect.

Optionally, the chip further includes a memory, and the memory and the processor are connected to the memory by using a circuit or a wire.

Further, optionally, the chip further includes a communication interface.

According to an eleventh aspect, this application provides a chip, including a processor. The processor is configured to read and execute a computer program stored in a memory, to perform the method according to any one of the second aspect or the possible implementations of the second aspect.

Optionally, the chip further includes a memory, and the memory and the processor are connected to the memory by using a circuit or a wire.

Further, optionally, the chip further includes a communication interface.

According to a twelfth aspect, this application provides a computer program product. The computer program product includes computer program code. When the computer program code is run on a computer, the computer is enabled to perform the method according to any one of the first aspect and the possible designs of the first aspect.

According to a thirteenth aspect, this application provides a computer program product. The computer program product includes computer program code. When the computer program code is run on a computer, the computer is enabled to perform the method according to any one of the second aspect or the possible implementations of the second aspect.

DESCRIPTION OF EMBODIMENTS

The following describes technical solutions of this application with reference to accompanying drawings.

The technical solutions in embodiments of this application may be applied to various communication systems such as a global system for mobile communications (global system for mobile communications, GSM) system, a code division multiple access (code division multiple access, CDMA) system, and a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a 5th generation (5th generation, 5G) system, new radio (new radio, NR), a future evolved communication system, and the like.

Figure 1:
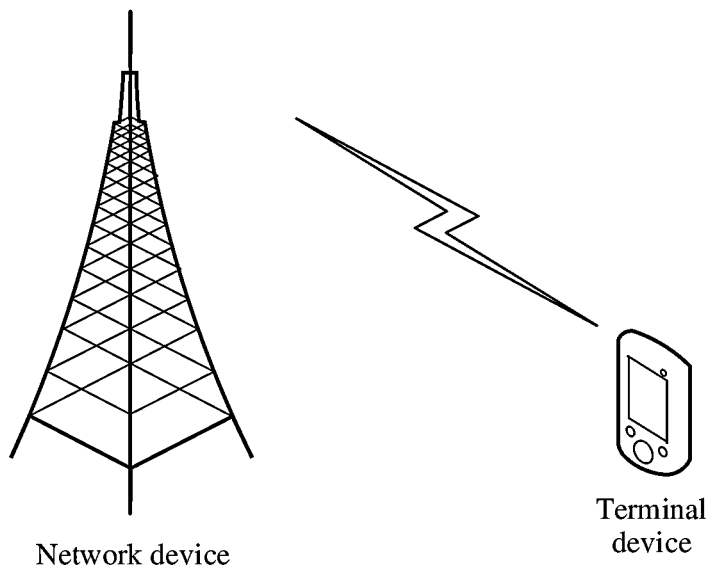
FIG. 1 is a schematic diagram of a communication system according to an embodiment of this application.

First, an application scenario of this application is described. FIG. 1 is a schematic diagram of a communication system applicable to this application.

The communication system includes a network device and a terminal device. The terminal device communicates with the network device by using an electromagnetic wave.

In this application, the terminal device may be a device that includes a wireless receiving and sending function and that may cooperate with the network device to provide a communication service for a user. Specifically, the terminal device may be user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, or a terminal device in a future 5G network or a network after 5G. This is not limited in embodiments of this application.

Embodiments of this application further relate to a network device. The network device may be a device configured to communicate with the terminal device. For example, the network device may be a base transceiver station (Base Transceiver Station, BTS) in a GSM system or a CDMA system, may be a NodeB (NodeB, NB) in a WCDMA system, or may be an evolved NodeB (Evolved NodeB, eNB or eNodeB) in an LTE system. Alternatively, the network device may be a relay station, an access point, a vehicle-mounted device, a wearable device, a network-side device in a future 5G network or a network after 5G, or a network device in a future evolved PLMN network.

The network device may also be referred to as a radio access network (radio access network, RAN) device. The RAN device is connected to the terminal device, and is configured to receive data from the terminal device and send the data to a core network device. The RAN device corresponds to different devices in different communication systems, for example, corresponds to a base station and a base station controller in a 2G system, corresponds to a base station and a radio network controller (radio network controller, RNC) in a 3G system, corresponds to an evolved NodeB (evolved node B, eNB) in a 4G system, and in a 5G system, corresponds to an access network device in the 5G system, for example, a new radio access system (new radio access technology, NR). The communication system in FIG. 1 is merely an example for description, and a communication system applicable to this application is not limited thereto. For example, the communication system may include another quantity of network devices and another quantity of terminal devices. For example, the communication system may further include more than two terminal devices.

Figure 2:
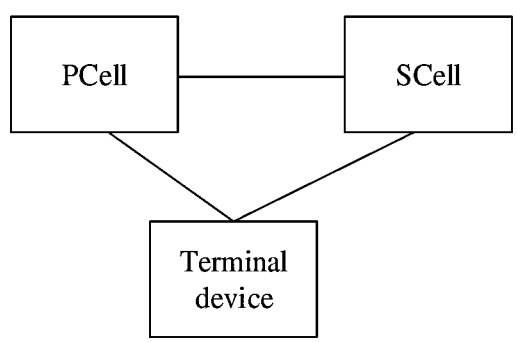
FIG. 2 is a schematic diagram of an application scenario according to an embodiment of this application.

FIG. 2 is a schematic diagram of an application scenario according to an embodiment of this application. A terminal device may simultaneously use a plurality of cells for uplink and downlink communication, to support high-speed data transmission. One cell in the plurality of cells is a primary cell (primary cell, PCell), and other cells are secondary cells (secondary cell, SCell). For simplicity, only one secondary cell is used as an example for description in FIG. 2. The plurality of cells in FIG. 2 can implement CA. In the CA, a physical downlink control channel (physical downlink control channel, PDCCH) and a physical downlink shared channel (physical downlink shared channel, PDSCH) are allowed to be in a same carrier component (carrier component, CC) or in different carrier components. In other words, cross-carrier scheduling is allowed. A CC, a bandwidth part (bandwidth part, BWP), a CC/BWP, and a CC and/or a BWP may usually be equivalently replaced because the CC, the bandwidth part (bandwidth part, BWP), the CC/BWP, and the CC and/or the BWP all describe a segment of frequency domain resources. The CC may also be equivalently replaced with a cell (cell).

The PCell in FIG. 2 is a cell that a terminal device camps. A physical uplink control channel (physical uplink control channel, PUCCH) corresponding to the terminal device on which the CA is configured is usually configured in the PCell, and is used to report physical layer indication information of the PCell and the SCell. For example, the physical layer indication information includes a channel quality indicator (channel quality indicator, CQI), a precoding matrix indication (precoding matrix indication, PMI), a hybrid automatic repeat request-feedback (hybrid automatic repeat request-acknowledgment, HARQ-ACK), and the like. The SCell in FIG. 2 is a cell configured, by using radio resource control (radio resource control, RRC) connection signaling, for the terminal device on which the CA is configured, works on a secondary carrier component (secondary carrier component, SCC), and may provide more radio resources for the terminal device on which the CA is configured. In the SCell, there may be only downlink transmission or both uplink and downlink transmission.

It should be noted that the PCell and the SCell in FIG. 2 may be cells generated by a same network device in FIG. 1, or may be cells generated by different network devices. This is not limited in embodiments of this application.

The SCell that needs to be activated by the terminal device may be a known secondary cell or an unknown secondary cell. Usually, the terminal device may activate the SCell based on a synchronization signal/physical broadcast channel block (synchronization signal/physical broadcast channel block, SSB) sent by the network device. However, because a sending period of the SSB is long (the period is usually greater than or equal to 20 milliseconds), a delay of activating the SCell by the terminal device is long.

To reduce the delay of activating the SCell by the terminal device, the network device may send an aperiodic or short interval periodic channel state information (channel state information, CSI)-reference signal (reference signal, RS), and the terminal device may activate the SCell by using the aperiodic or short interval periodic CSI-RS. A period of the short interval periodic CSI-RS is shorter than a period of the SSB. For example, the period of sending the SSB by the network device is 20 milliseconds (ms), and the period of the CSI-RS is 10 ms. This can reduce the delay of activating the SCell by the terminal device. Alternatively, the network device sends the RS to a specified terminal device promptly, to skip time in which the terminal device waits for a periodic RS. When the SCell that needs to be activated is the known cell, the network device may send the aperiodic or short interval periodic CSI-RS after sending an activation command or 3 ms after sending the activation command. However, when the activated SCell is the unknown cell, the terminal device needs to first detect the secondary cell, to obtain coarse timing information of the secondary cell. Time at which the terminal device completes secondary cell detection is not fixed, but is determined based on conditions such as an implementation of the terminal device and a channel state. The terminal device may perform secondary cell detection based on the SSB, and may receive another reference signal sent by using the secondary cell only after the secondary cell detection is completed. Therefore, if the activated secondary cell is the unknown secondary cell, the network device does not know when to send the CSI-RS. If the network device sends the CSI-RS prematurely, a waste of signaling is caused when the terminal device has not detected the SCell. If the network device sends the CSI-RS late, duration in which the SCell is activated increases. For example, the network device sends the aperiodic or short interval periodic CSI-RS at a moment t1, and the terminal device detects the SCell at a moment t2, where t1 is before t2. If the network device sends the aperiodic CSI-RS, the terminal device cannot receive the CSI-RS. If the network device sends the short interval periodic CSI-RS, a waste of CSI-RSs that are sent in a time period from t1 to t2 is caused. For another example, the terminal device detects the SCell at a moment t2, and the network device sends the aperiodic or short interval periodic CSI-RS at a moment t3, where t2 is before t3. The terminal device cannot activate the SCell by using the aperiodic or short interval periodic CSI-RS in a time period from t2 to t3. As a result, the delay of activating the SCell by the terminal device is long.

For the foregoing problem, in the method for activating a secondary cell according to this embodiment of this application, if the activated cell is the unknown secondary cell, after the terminal device detects the secondary cell, the terminal device may send indication information to the network device. The network device sends an RS to the terminal device in response to the indication information sent by the terminal device. Therefore, this can avoid a case in which the terminal device waits for the network device to send an RS with a long period, and this can reduce the delay of activating the secondary cell.

The following describes a communication method for activating a secondary cell according to an embodiment of this application with reference to the accompanying drawings.

Figure 3:
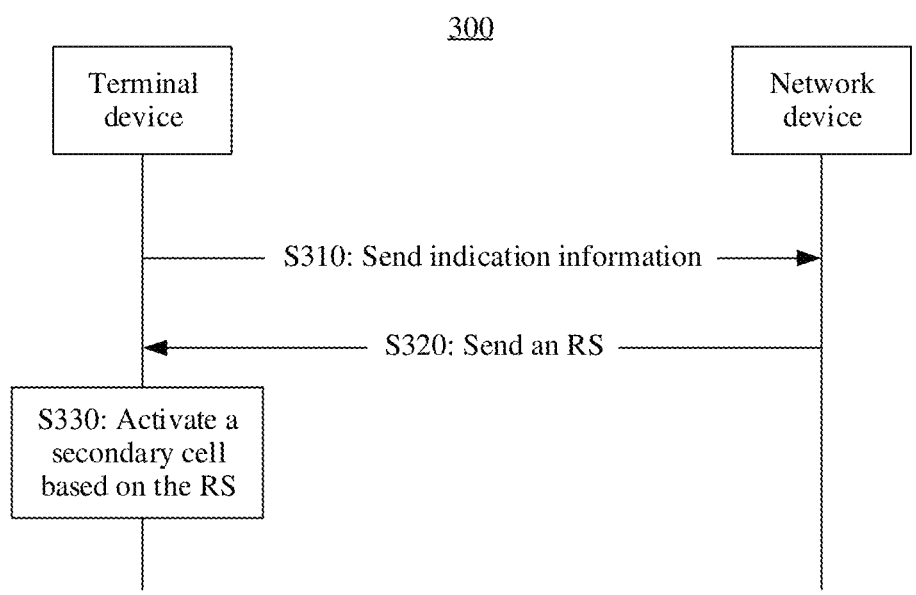
FIG. 3 is a schematic diagram of a communication method for activating a secondary cell according to an embodiment of this application.

FIG. 3 shows a communication method 300 for activating a secondary cell according to the embodiment of this application. The method includes the following steps.

S310: After a terminal device detects a secondary cell, the terminal device sends indication information to a network device, and the network device receives the indication information sent by the terminal device. Optionally, the terminal device may send the indication information to the network device by using a primary cell on which CA is configured, and the network device receives the indication information sent by the terminal device by using the primary cell.

Optionally, that the terminal device detects the secondary cell may be understood as follows. Before a secondary cell activation process, the terminal device does not report a measurement result of the secondary cell to the network device within a preset period of time, and the secondary cell is an unknown secondary cell. After the unknown secondary cell is detected by the terminal device (the terminal device may detect the cell by using an SSB sent by the network device, for example, the SSB may be sent by the network device in a conventional technology to the terminal device), it may be understood that the secondary cell is detected.

The following describes an occasion for sending the indication information by the terminal device to the network device.

Optionally, a time threshold for the terminal device to detect the secondary cell may be specified. If the terminal device needs to complete secondary cell detection within the time threshold, the terminal device sends the indication information to the network device on a first sending occasion after detecting the secondary cell. The first sending occasion after the secondary cell is detected is not later than a first sending occasion after the time threshold. In other words, the terminal device sends the indication information to the network device on the first sending occasion after detecting the secondary cell. The first sending occasion after the secondary cell is detected may be earlier than the first sending occasion after the time threshold. Alternatively, the terminal device sends the indication information to the network device by using the first sending occasion after the time threshold at the latest. In this way, this can avoid a case in which the terminal device does not send the indication information after detecting the secondary cell, and this helps the terminal device that can quickly complete the secondary cell detection send the indication information promptly. This ensures that the network device quickly detects the indication information, and triggers the network device to send the RS. This helps reduce a delay of sending the RS.

Figure 4:
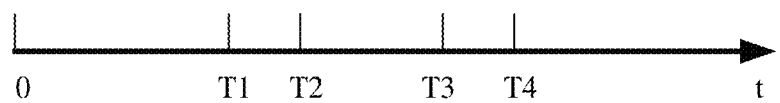
FIG. 4 is a schematic diagram of a time axis according to an embodiment of this application.

The following describes the foregoing two first sending occasions with reference to a time axis in FIG. 4. T3 is the foregoing time threshold, and it may be specified that the terminal device needs to complete the secondary cell detection within T3. If a terminal device completes the secondary cell detection within T1, T2 is the first sending occasion after the secondary cell is detected, and the terminal device needs to send the indication information to the network device at T2. T4 is the first sending occasion after the time threshold. T2 is not later than T4, and T2 is the same as T4 at the latest. In this way, this can avoid a case in which the terminal device does not send the indication information after detecting the secondary cell, and this helps the terminal device that can quickly complete the secondary cell detection send the indication information promptly.

The following describes a resource for sending the indication information by the terminal device to the network device. The following uses three cases for discussion.

Case 1: The network device may send first configuration information to the terminal device. The first configuration information is used to indicate a first resource for sending the indication information by the terminal device. In this way, the terminal device may send the indication information to the network device by using the resource indicated by the first configuration information. The first resource may be a dedicated resource for sending the indication information by the terminal device.

Case 2: A first resource indicated by first configuration information sent by the network device to the terminal device may be a resource for reporting layer1-reference signal received power (layer1-reference signal received power, L1-RSRP) by the terminal device. In other words, the terminal device may reuse the resource used to report the L1-RSRP in a secondary cell activation process. In this way, an additional resource does not need to be occupied to send the indication information, so that resource overheads are reduced. In addition, this can also avoid overheads caused when the network device needs to configure, for the terminal device, a dedicated resource for sending the indication information.

Case 3: A first resource indicated by first configuration information sent by the network device to the terminal device may alternatively be an SR resource, a PRACH resource, or the like. This can also avoid overheads caused when the network device needs to configure, for the terminal device, a dedicated resource for sending the indication information.

Optionally, in the foregoing three cases, the indication information sent by the terminal device may indicate information about a transmit beam recommended to be used by the network device. For example, the information about the transmit beam may be an index of the transmit beam.

S320: The network device sends the RS to the terminal device by using the secondary cell in response to the indication information, and the terminal device receives the RS sent by the network device by using the secondary cell.

It should be noted that the RS in this embodiment of this application may be referred to as a temporary (temporary) RS or an additional (additional) RS. To be specific, the network device sends an RS, for example, a short interval periodic (short interval periodic) RS, an aperiodic (aperiodic) RS, or the like, to the terminal device to assist the terminal device in quickly completing secondary cell activation. The temporary RS has a shorter period or better timeliness than a regular RS (for example, an SSB with a sending period of 20 ms) sent by the network device by using the secondary cell (for example, the temporary RS is sent when the terminal device needs an RS, to skip time for waiting for a periodic RS). This can reduce a delay of activating the secondary cell.

Optionally, in this embodiment of this application, the RS may include the SSB or a tracking reference signal (tracking reference signal, TRS). Specifically, whether the RS includes the SSB or the TRS may be specified in a protocol, or may be preconfigured. This is not limited in embodiments of this application. In this way, the terminal device may perform, based on the SSB or the TRS sent by the network device, operations, for example, automatic gain control (autonomous gain control, AGC), fine synchronization, and the like, that need to be completed in the activation process. It should be noted that the AGC and the fine synchronization herein are steps in the cell activation process.

Optionally, the RS may alternatively include a CSI-RS, and the terminal device measures channel state information (channel state information, CSI) based on the CSI-RS. The terminal device sends the CSI to the network device. That the terminal device measures the CSI based on the CSI-RS is also a step in the cell activation process. After the terminal device sends the CSI to the network device, it indicates that cell activation is completed.

Optionally, the network device may send the RS to the network device in response to the indication information. In other words, the indication information in this case is used to trigger the network device to send the RS. In addition, the indication information may further indicate an SSB index corresponding to the transmit beam of the network device, and a quantity of SSB indexes is one. One transmit beam corresponds to one SSB index, and one transmit beam may send an SSB, a TRS, or a CSI-RS. The terminal device reports only one SSB index, and when sending the RS by using the secondary cell in response to the indication information, the network device may send the RS to the terminal device by using the transmit beam corresponding to the SSB index. In this way, the terminal device may learn the transmit beam for sending the RS, without the network device sending additional beam indication information to indicate the transmit beam of the network device to the terminal device (the transmit beam indication information is used to indicate a transmit beam used when the network device sends data or an RS to the terminal device, for example, the transmit indication information may be a TCI). In this way, the terminal device may determine, based on the transmit beam of the network device, a receive beam for receiving the RS. After the terminal device determines a receive beam of an SSB corresponding to the SSB index, the terminal device may receive, by using the receive beam, the RS sent by the network device by using the transmit beam corresponding to the SSB index. In other words, the terminal device expects that the RS and the SSB corresponding to the SSB index indicated by the indication information are QCL. This can avoid overheads caused by the transmit beam indication information sent by the network device and an activation delay caused by signaling interaction.

Optionally, if the RS includes the SSB, S320 includes: The network device sends, by using the secondary cell, the SSB corresponding to the SSB index to the terminal device, and the terminal device receives the SSB, corresponding to the SSB index, sent by the network device by using the secondary cell. In this way, the network device sends, to the terminal device, only the SSB, corresponding to the SSB index, reported by the terminal device, and does not send an SSB corresponding to another SSB index. The terminal device may learn that the SSB sent by the network device is an SSB corresponding to the SSB index reported by the terminal device. This can avoid overheads caused by additional sending of all SSBs by the network device to the terminal device to enable the terminal device to activate the secondary cell.

Optionally, the network device may periodically or aperiodically send the RS. Before S320, the method further includes: The network device sends second configuration information to the terminal device, and the terminal device receives the second configuration information sent by the network device. The second configuration information is used to indicate a period and/or a quantity of times of sending the RS by the network device. S320 includes: The network device sends, in response to the indication information, the RS to the terminal device by using the secondary cell based on the period and/or the quantity of times indicated by the second configuration information, and the terminal device receives, based on the period and/or the quantity of times indicated by the second configuration information, the RS sent by the network device by using the secondary cell. In other words, the second configuration information may indicate only the period of sending the RS by the network device, may indicate only the quantity of times of sending the RS by the network device, or may indicate the period and the quantity of times of sending the RS by the network device. Certainly, the second configuration information may further indicate a start time-frequency location at which the RS is sent, or the like. This is not limited in embodiments of this application.

It should be noted that, in this embodiment of this application, if the RS includes the SSB, the period, indicated by the second configuration information, in which the network device sends the SSB is a first period, and/or the quantity of times is a first quantity of times. If the RS includes the TRS, the period, indicated by the second configuration information, in which the network device sends the TRS is a second period, and/or the quantity of times is a second quantity of times. If the RS includes the CSI-RS, the period, indicated by the second configuration information, in which the network device sends the CSI-RS is a third period, and/or the quantity of times is a third quantity of times. Two of the first period, the second period, and the third period may be equal, or the first period, the second period, and the third period may be different. This is not limited in embodiments of this application. Two of the first quantity, the second quantity, and the third quantity may be equal, or the first quantity, the second quantity, and the third quantity may be different. This is not limited in embodiments of this application.

S330: The terminal device activates the secondary cell based on the RS.

It should be noted that for the unknown secondary cell, activating the secondary cell mentioned in this embodiment of this application may include one or more of the following steps.

Step 1: The terminal device receives an activation command sent by the network device.

Step 2: The terminal device detects the unknown secondary cell (performs detection based on the SSB) according to the activation command Step 3: If detecting the secondary cell, the terminal device performs AGC (performs AGC based on the SSB).

Step 4: The terminal device reports, to the network device by using a layer1 (layer1) resource, the L1-RSRP and the information about the transmit beam of the network device (reports, based on the SSB or the CSI-RS, the L1-RSRP and the information about the transmit beam of the network device).

Step 5: The terminal device receives a transmission configuration indicator (transmission configuration indicator, TCI) sent by the network device, where the TCI includes the information about the transmit beam, determined by the network device, of the network device.

Step 6: The terminal device performs fine synchronization with the network device (performs fine synchronization based on the SSB).

Step 7: The terminal device measures the CSI based on the CSI-RS, and reports the CSI obtained through measurement to the network device.

Therefore, in S330, if the RS includes the SSB or the TRS, the terminal device may perform step 3, step 4, step 5, and step 6 based on the SSB or the TRS. In other words, step 3, step 4, step 5, and step 6 may be implemented based on the SSB or the TRS. If the RS includes the CSI-RS, the terminal device may perform step 7 based on the CSI-RS.

In this embodiment of this application, in a scenario in which the unknown secondary cell is activated, after the terminal device detects the secondary cell, the terminal device may send the indication information to the network device. The network device sends the RS to the terminal device in response to the indication information, and the terminal device may activate the secondary cell based on the RS. This can avoid a delay caused by waiting for an RS with a long period, and this helps reduce a delay of activating the secondary cell. In other words, in this application, sending of the RS by the network device to the terminal device is triggered based on the indication information sent by the terminal device. This can avoid a case in which the terminal device needs to wait for the RS with the long period to activate the secondary cell, and therefore this reduces the delay of activating the secondary cell. Further, the terminal device may send the indication information to the network device at the first sending occasion after preset time for detecting the secondary cell. This can further reduce a delay of sending the RS by the network device, and this helps reduce the delay of activating the secondary cell. The terminal device may send the indication information to the network device by using the dedicated first resource indicated by the first configuration information, or may send the indication information to the network device by using an L1-RSRP resource and/or a resource for sending the information about the transmit beam of the network device. This helps reduce resource overheads. In addition, the indication information may further indicate one SSB index corresponding to the transmit beam of the network device. To be specific, one transmit beam corresponding to the one SSB index of the network device sends only an SSB or a TRS, and the network device does not send another SSB. Therefore, this can reduce signaling overheads. In addition, the terminal device expects that the RS sent by the network device is the SSB or the TRS corresponding to the transmit beam. Therefore, this can improve receiving efficiency.

Figure 5:
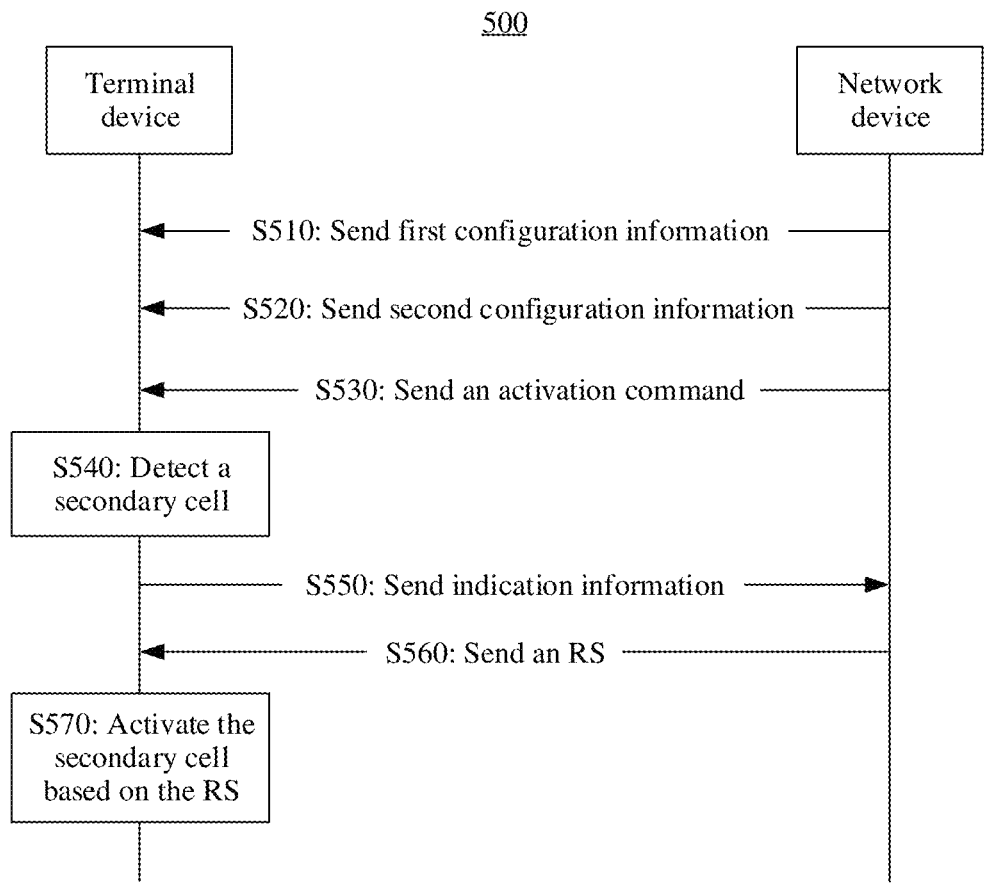
FIG. 5 is another schematic diagram of a communication method for activating a secondary cell according to an embodiment of this application.

The following uses an example to describe a communication method 500 for activating a secondary cell according to an embodiment of this application with reference to FIG. 5. The method includes the following steps.

S510: A network device sends first configuration information to a terminal device, and the terminal device receives the first configuration information, where the first configuration information is used to indicate a first resource for sending indication information by the terminal device.

S520: The network device sends second configuration information to the terminal device, and the terminal device receives the second configuration information, where the second configuration information is used to indicate a period and/or a quantity of times of sending an RS by the network device.

It should be noted that S510 may be performed before, after, or simultaneously with S520.

S530: The network device sends an activation command to the terminal device, and the terminal device receives the activation command sent by the network device, where the activation command is used to indicate the terminal device to activate a secondary cell.

S540: After receiving the activation command, the terminal device detects the secondary cell based on an SSB (The SSB is an SSB sent by an existing network device to a cell, that is, the SSB is a cell-level SSB, and is not sent for a specific terminal device) sent by the network device. If detecting the secondary cell, the terminal device determines a best transmit beam of the network device based on a detection result, and the terminal device determines a receive beam, of the terminal device, corresponding to the best transmit beam of the network device.

S550: In S540, the terminal device needs to detect the secondary cell within preset time, and the terminal device needs to send the indication information to the network device by using the first resource at a first sending occasion after the preset time for detecting the secondary cell. The indication information is used to trigger the network device to send the RS to the terminal device.

Optionally, the first resource may be a dedicated resource. For example, the dedicated resource may be a random access channel (random access channel, RACH) or a scheduling request (scheduling request, SR) resource. For example, the terminal device may send the indication information to the network device by using the first resource after step 2 and before step 4 in the secondary cell activation process described in the method 300.

Optionally, the first resource may be an L1-RSRP resource and/or a resource for reporting information about a transmit beam of the network device. In this way, the terminal device may report LS-RSRP, the information about the transmit beam of the network device, and the indication information to the network device by using the L1-RSRP resource and/or the resource for reporting the information about the transmit beam of the network device. In other words, the indication information may be sent to the network device in step 4 in the secondary cell activation process described in the method 300.

S560: After receiving the indication information sent by the terminal device, the network device sends the RS to the terminal device, and the terminal device receives the RS. Optionally, the RS includes at least one of the SSB, a TRS, or a CSI-RS. Specifically, which reference signal, of the SSB, the CSI-RS, and the TRS, that the network device sends to the terminal device may be preset or configured by the network device. This is not limited in embodiments of this application.

Specifically, in S560, the network device may send the RS to the terminal device based on a configuration period and/or configuration quantity of times of the second configuration information.

In an optional embodiment, in S550, the indication information may further include one SSB index corresponding to one transmit beam of the network device. When sending the RS by using the secondary cell in response to the indication information, the network device may send the RS to the terminal device by using the transmit beam corresponding to the SSB index. In this way, the terminal device may learn the transmit beam for sending the RS, without the network device sending additional beam indication information to indicate the transmit beam of the network device to the terminal device (The transmit beam indication information is used to indicate a transmit beam used when the network device sends data or an RS to the terminal device. For example, the transmit beam indication information may be a TCI).

S570: The terminal device activates, based on the RS, the secondary cell detected in S540.

Optionally, S570 may specifically include one or more of step 3, step 6, step 5, step 6, and step 7 of activating the secondary cell in the method 300.

The methods for activating a secondary cell according to embodiments of this application are described in detail above with reference to FIG. 3 to FIG. 5. Apparatuses for activating a secondary cell according to embodiments of this application are described in detail below with reference to FIG. 6 to FIG. 13.

Figure 6:
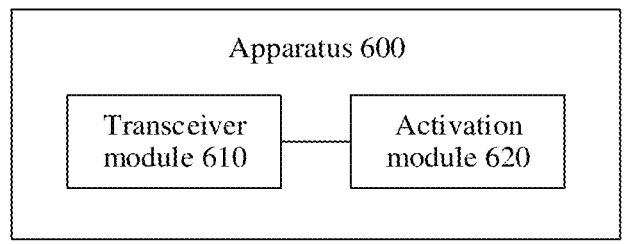
FIG. 6 is a schematic diagram of an apparatus for activating a secondary cell according to an embodiment of this application.

FIG. 6 shows an apparatus 600 for activating a secondary cell according to an embodiment of this application. The apparatus 600 includes:

a transceiver module 610, configured to send indication information to a network device after a secondary cell is detected, where the transceiver module 610 is further configured to receive an RS sent by the network device by using the secondary cell, and the RS is sent by the network device in response to the indication information; and an activation module 620, configured to activate the secondary cell based on the RS.

In an embodiment, the transceiver module 610 is specifically configured to:

send the indication information to the network device on a first sending occasion after the secondary cell is detected, where the first sending occasion after the secondary cell is detected is not later than a first sending occasion after a time threshold for detecting the secondary cell.

In an embodiment, the transceiver module 610 is further configured to receive first configuration information sent by the network device, where the first configuration information is used to indicate a first resource for sending the indication information.

That a transceiver module 610 is configured to send indication information to a network device includes: The transceiver module 610 sends the indication information to the network device by using the first resource indicated by the first configuration information.

In an embodiment, the first resource indicated by the first configuration information is a resource for reporting layer 1 reference signal received power L1-RSRP.

In an embodiment, the indication information is used to indicate a synchronization signal/physical broadcast channel block SSB index corresponding to a transmit beam recommended to be used by the network device, and a quantity of SSB indexes is one.

In an embodiment, the apparatus 600 expects that the RS and an SSB corresponding to the SSB index indicated by the indication information are quasi co-located QCL.

In an embodiment, the RS includes the SSB, and that the transceiver module is configured to receive an RS sent by the network device by using the secondary cell includes:

The transceiver module receives the SSB corresponding to the SSB index indicated by the indication information sent by the network device.

In an embodiment, the RS includes a tracking reference signal TRS.

In an embodiment, the RS includes a channel state information CSI-reference signal RS.

In an embodiment, the transceiver module 610 is further configured to receive second configuration information sent by the network device, where the second configuration information is used to indicate a period and/or a quantity of times of sending the RS by the network device. That the transceiver module 610 is configured to receive an RS sent by the network device by using the secondary cell includes: The transceiver module 610 receives, based on the period and/or the quantity of times indicated by the second configuration information, the RS sent by the network device by using the secondary cell.

It should be understood that the activation module 620 in this embodiment of this application may be implemented by a processor or a processor-related circuit component, and the transceiver module 610 may be implemented by a transceiver or a transceiver-related circuit component.

Figure 7:
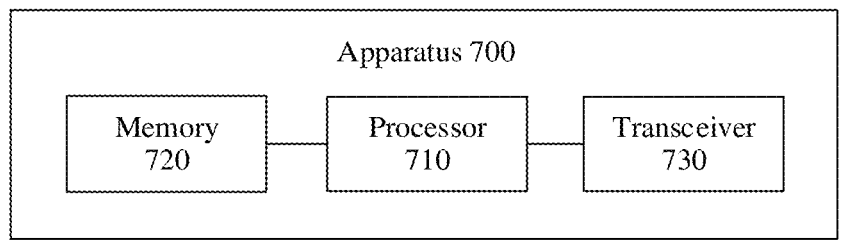
FIG. 7 is another schematic block diagram of an apparatus for activating a secondary cell according to an embodiment of this application.

As shown in FIG. 7, an embodiment of this application further provides an apparatus 700 for activating a secondary cell. The apparatus 700 includes a processor 710, a memory 720, and a transceiver 730. The memory 720 stores instructions or a program. The processor 710 is configured to execute the instructions or the program stored in the memory 720. When the instructions or the program stored in the memory 720 is executed, the processor 710 is configured to perform an operation performed by the activation module 620 in the foregoing embodiment, and the transceiver 730 is configured to perform an operation performed by the transceiver module 610 in the foregoing embodiment.

It should be understood that the apparatus 600 or the apparatus 700 according to the embodiment of this application may correspond to the terminal device in the method 300 for activating a secondary cell and the terminal device in the method 500 for activating a secondary cell in the embodiment of this application. In addition, operations and/or functions of modules in the apparatus 600 or the apparatus 700 are separately used to implement corresponding procedures of the methods in FIG. 3 and FIG. 5. For brevity, details are not described herein again.

Figure 8:
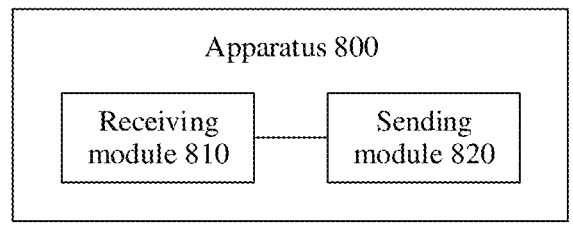
FIG. 8 is another schematic block diagram of an apparatus for activating a secondary cell according to an embodiment of this application.

FIG. 8 shows an apparatus 800 for activating a secondary cell according to an embodiment of this application. The apparatus 800 includes:

a receiving module 810, configured to receive indication information sent by a terminal device; and a sending module 820, configured to send a reference signal RS to the terminal device by using a secondary cell in response to the indication information.

In an embodiment, the sending module 820 is further configured to:

send first configuration information to the terminal device, where the first configuration information is used to indicate a first resource for sending the indication information by the terminal device.

That a receiving module 810 is configured to receive indication information sent by a terminal device includes:

The receiving module 810 receives, on the first resource, the indication information sent by the terminal device.

In an embodiment, the first resource indicated by the first configuration information is a resource for reporting layer 1 reference signal received power L1-RSRP by the terminal device.

In an embodiment, the indication information is used to indicate a synchronization signal/physical broadcast channel block SSB index corresponding to a transmit beam recommended to be used by the apparatus, and a quantity of SSB indexes is one.

In an embodiment, the apparatus ensures that the RS and an SSB corresponding to the SSB index indicated by the indication information are quasi co-located QCL.

In an embodiment, the RS includes the SSB, and that a sending module is configured to send an RS to the terminal device by using a secondary cell in response to the indication information includes:

The sending module 820 sends, to the terminal device by using the secondary cell in response to the indication information, the SSB corresponding to the SSB index indicated by the indication information.

In an embodiment, the RS includes a tracking reference signal TRS.

In an embodiment, the RS includes a channel state information CSI-reference signal RS.

In an embodiment, the sending module 820 is further configured to:

send second configuration information to the terminal device, where the second configuration information is used to indicate a period and/or a quantity of times of sending the RS by the network device.

That a sending module 820 is configured to send an RS to the terminal device by using a secondary cell in response to the indication information includes:

The sending module 820 sends, in response to the indication information, the RS to the terminal device by using the secondary cell based on the period and/or the quantity of times indicated by the second configuration information.

It should be understood that the receiving module 810 and the sending module 820 in this embodiment of this application may be implemented by a transceiver or a transceiver-related circuit component.

Figure 9:
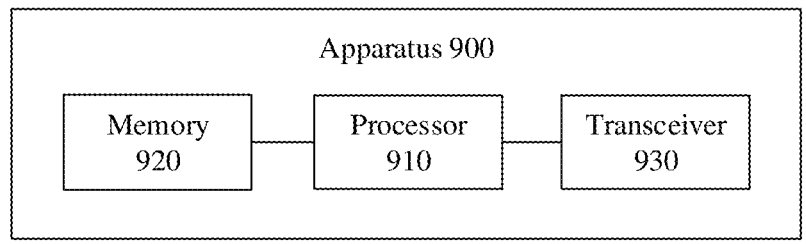
FIG. 9 is another schematic block diagram of an apparatus for activating a secondary cell according to an embodiment of this application.

As shown in FIG. 9, an embodiment of this application further provides an apparatus 900 for activating a secondary cell. The apparatus 900 includes a processor 910, a memory 920, and a transceiver 930. The memory 920 stores instructions or a program. The processor 910 is configured to execute the instructions or the program stored in the memory 920. When the instructions or the program stored in the memory 920 are executed, the transceiver 930 is configured to perform operations performed by the receiving module 810 and the sending module 820 in the foregoing embodiment.

It should be understood that the apparatus 800 or the apparatus 900 according to the embodiment of this application may correspond to the network device in the method 300 for activating a secondary cell and the terminal device in the method 500 for activating a secondary cell in the embodiment of this application. In addition, operations and/or functions of modules in the apparatus 800 or the apparatus 900 are separately used to implement corresponding procedures of the methods in FIG. 3 and FIG. 5. For brevity, details are not described herein again.

Figure 10:
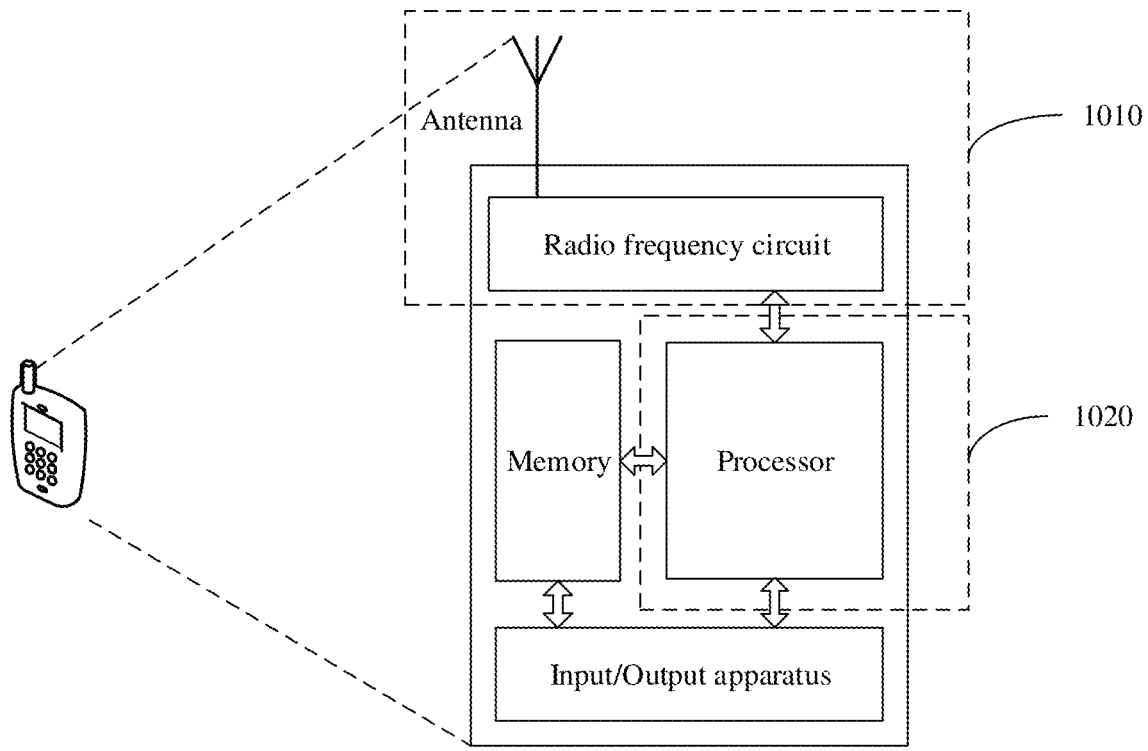
FIG. 10 is another schematic block diagram of an apparatus for activating a secondary cell according to an embodiment of this application.

When the apparatus is the terminal device, FIG. 10 is a simplified schematic diagram of a structure of the terminal device. For ease of understanding and convenience of figure illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. A radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, a keyboard, or the like is mainly configured to: receive data input by a user, and output data to the user. It should be noted that some types of terminal devices may have no input/output apparatus.

When needing to send data, after performing baseband processing on the to-be-sent data, the processor outputs a baseband signal to the radio frequency circuit. The radio frequency circuit performs radio frequency processing on the baseband signal, and then sends the radio frequency signal to outside in the form of the electromagnetic wave by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna that has sending and receiving functions and the radio frequency circuit may be considered as a transceiver unit of the terminal device, and the processor that has a processing function may be considered as a processing unit of the terminal device. As shown in FIG. 10, the terminal device includes the transceiver unit 1010 and the processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. In other words, the transceiver unit 1010 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1010 is configured to perform a sending operation and a receiving operation on a terminal device side in the foregoing method embodiments, and the processing unit 1020 is configured to perform another operation other than the receiving operation and the sending operation of the terminal device in the foregoing method embodiments.

For example, in an implementation, the transceiver unit 1010 is configured to perform the sending operation on the terminal device side in S310 in FIG. 3 or the receiving operation on the terminal device side in S320 in FIG. 3, and/or the transceiver unit 1010 is further configured to perform another sending step and another receiving step on the terminal device side in embodiments of this application. The processing unit 1020 is configured to perform S330 in FIG. 3, and/or the processing unit 1020 is further configured to perform another processing step on the terminal device side in embodiments of this application.

For another example, in another implementation, the transceiver unit 1010 is configured to perform receiving operations on the terminal device side in S510, S520, S530, and S560 in FIG. 5, or a sending operation on the terminal device side in S550 in FIG. 5; and/or the transceiver unit 1010 is further configured to perform another sending step and another receiving step on the terminal device side in embodiments of this application.

When the communication apparatus is a chip apparatus or circuit, the chip apparatus may include a transceiver unit and a processing unit. The transceiver unit may be an input/output circuit and/or a communication interface. The processing unit is a processor, a microprocessor, or an integrated circuit integrated on the chip.

Figure 11:
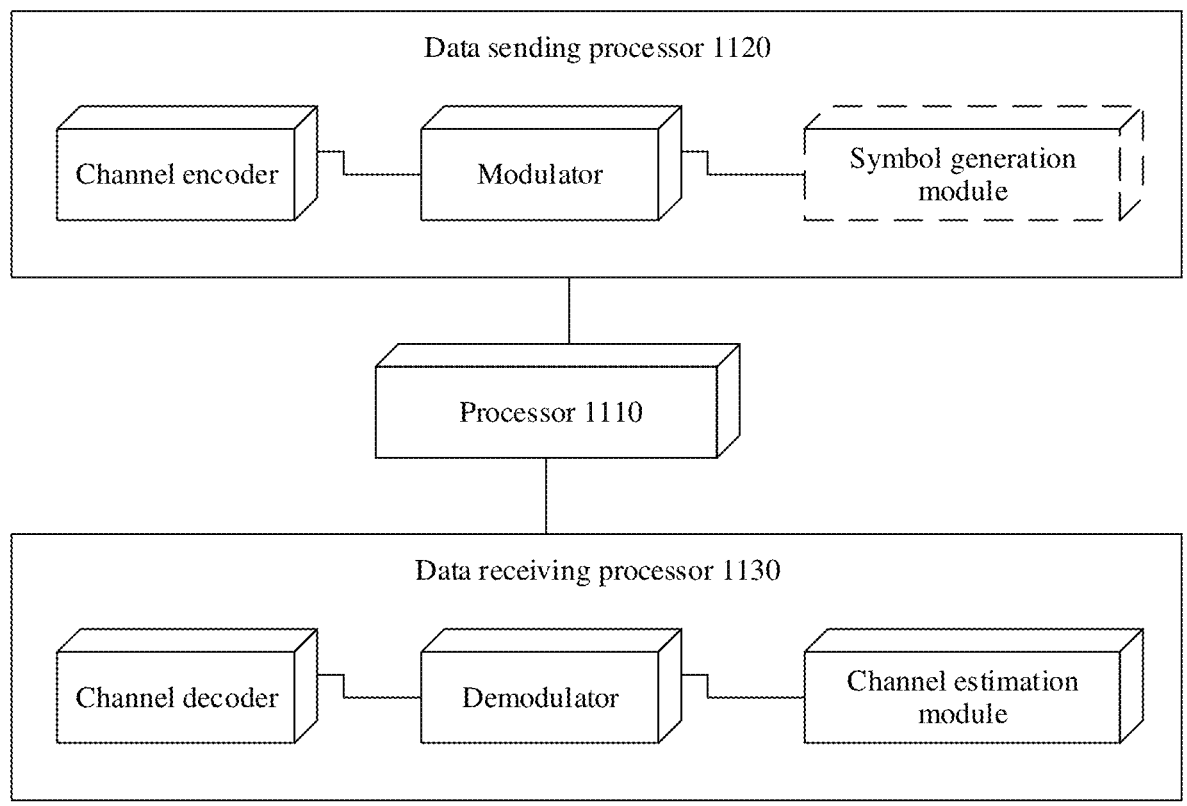
FIG. 11 is another schematic block diagram of an apparatus for activating a secondary cell according to an embodiment of this application.

When the apparatus for activating a secondary cell in the embodiment is a terminal device, refer to a device shown in FIG. 11. In an example, the device may implement a function similar to a function of the processor 710 in FIG. 7. In FIG. 11, the device includes a processor 1110, a data sending processor 1120, and a data receiving processor 1130. The activation module 620 in the foregoing embodiment may be the processor 1110 in FIG. 11, and implements a corresponding function. The transceiver module 610 in the foregoing embodiment may be the data sending processor 1120 and/or the data receiving processor 1130 in FIG. 11. Although FIG. 11 shows a channel encoder and a channel decoder, it may be understood that the modules are merely examples, and do not constitute a limitation on this embodiment.

Figure 12:
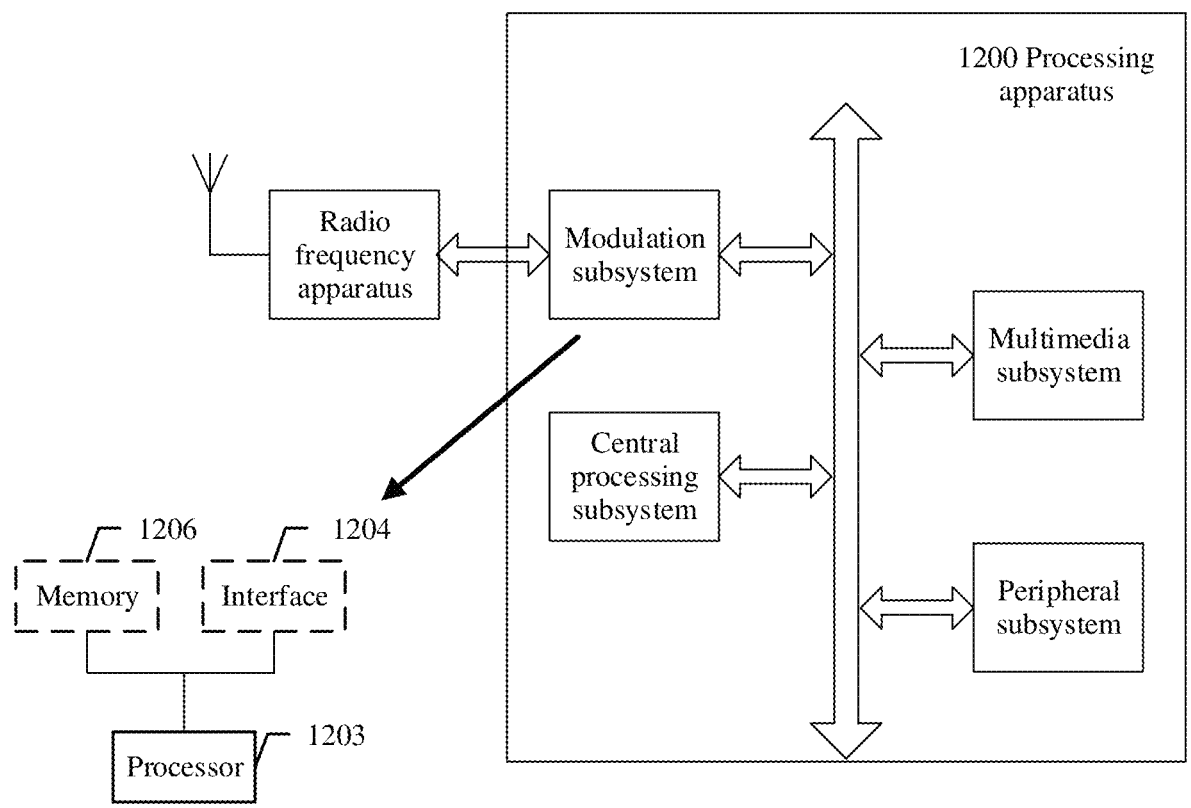
FIG. 12 is another schematic block diagram of an apparatus for activating a secondary cell according to an embodiment of this application.

FIG. 12 shows another form according to an embodiment of this application. A processing apparatus 1200 includes modules such as a modulation subsystem, a central processing subsystem, and a peripheral subsystem. The apparatus for activating a secondary cell in the embodiment may be used as the modulation subsystem in the processing apparatus 1200. Specifically, the modulation subsystem may include a processor 1203 and an interface 1204. The processor 1203 implements a function of the activation module 620, and the interface 1204 implements a function of the transceiver module 610. In another variant, the modulation subsystem includes a memory 1206, a processor 1203, and a program that is stored in the memory 1206 and that can be run on the processor. When executing the program, the processor 1203 implements the method on the terminal device side in the foregoing method embodiments. It should be noted that the memory 1206 may be non-volatile or volatile. The memory 1206 may be located in the modulation subsystem, or may be located in the processing apparatus 1200, provided that the memory 1206 can be connected to the processor 1203.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product including instructions is provided. When the instructions are executed, the method on the terminal device side in the foregoing method embodiments is performed.

Figure 13:
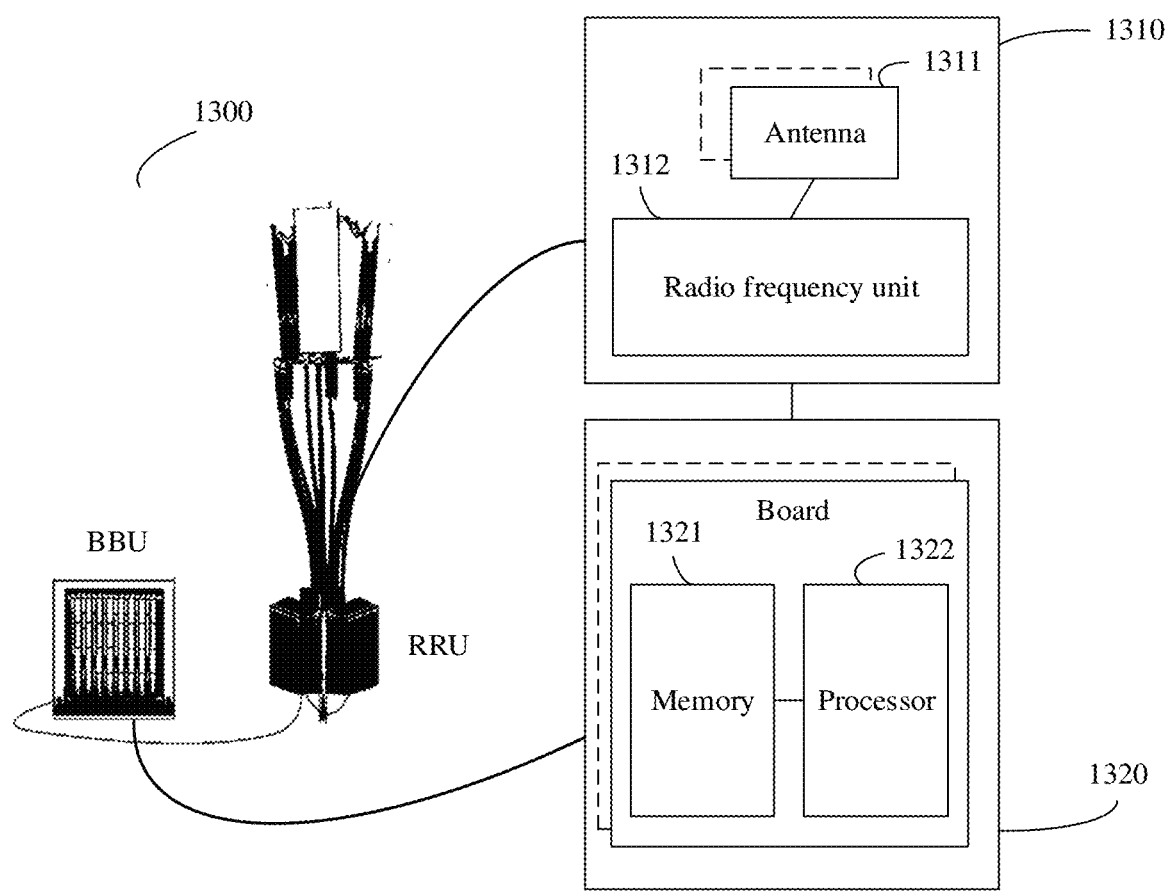
FIG. 13 is another schematic block diagram of an apparatus for activating a secondary cell according to an embodiment of this application.

When the apparatus in this embodiment is a network device, the network device may be shown in FIG. 13. An apparatus 1300 includes one or more radio frequency units such as a remote radio unit (remote radio unit, RRU) 1310 and one or more baseband units (baseband unit, BBU) (which may also be referred to as digital units (digital units, DU)) 1320. The RRU 1310 may be referred to as a transceiver module, and corresponds to the receiving module 810 and the sending module 820 in FIG. 8. Optionally, the transceiver module may also be referred to as a transceiver machine, a transceiver circuit, a transceiver, or the like, and may include at least one antenna 1311 and a radio frequency unit 1312. The RRU 1310 part is mainly configured to: send and receive a radio frequency signal, and perform conversion between the radio frequency signal and a baseband signal. For example, the RRU 1310 is configured to send an RS to a terminal device. The BBU 1320 is mainly configured to: perform baseband processing, control the base station, and the like. The RRU 1310 and the BBU 1320 may be physically disposed together, or may be physically disposed separately, namely, a distributed base station.

The BBU 1320 is a control center of the base station, may also be referred to as a processing module, and is mainly configured to implement baseband processing functions such as channel coding, multiplexing, modulation, and spectrum spreading. For example, the BBU (the processing module) may be configured to control the base station to perform an operation procedure related to the network device in the foregoing method embodiments, for example, to generate the foregoing RS, and the like.

In an example, the BBU 1320 may include one or more boards, and a plurality of boards may jointly support a radio access network (for example, an LTE network) having a single access standard, or may separately support radio access networks (for example, an LTE network, a 5G network, or another network) having different access standards. The BBU 1320 further includes a memory 1321 and a processor 1322. The memory 1321 is configured to store necessary instructions and data. The processor 1322 is configured to control the base station to perform a necessary action, for example, is configured to control the base station to perform an operation procedure related to the network device in the foregoing method embodiments. The memory 1321 and the processor 1322 may serve the one or more boards. In other words, the memory and processor can be separately set on each board. Alternatively, a plurality of boards may share a same memory and a same processor. In addition, a necessary circuit may be further disposed on each board.

It should be understood that, the processor mentioned in embodiments of this application may be a central processing unit (central processing unit, CPU), the processor may further be another general-purpose processor, a digital signal processor (digital signal processor, DSP), an application-specific integrated circuit (application-specific integrated circuit, ASIC), a field programmable gate array (field programmable gate array, FPGA), or another programmable logic device, a discrete gate, a transistor logic device, a discrete hardware component, or the like. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that, the term "and/or" in this specification describes only an association relationship between associated objects, and indicates that three relationships may exist. For example, A and/or B may indicate the following three cases: Only A exists, both A and B exist, and only B exists. In addition, the character "/" in this specification generally indicates an "or" relationship between associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners.

For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual specifications to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium, for example, a USB flash drive, a removable hard disk, a read-only memory (read-only memory, ROM), a random access memory (random access memory, RAM), a magnetic disk, an optical disc, or the like that can store program code.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, configuration information from a network device, wherein the configuration information includes a time threshold for detecting a secondary cell by the terminal device;
   determining, by the terminal device, the secondary cell within the time threshold;
   sending, by the terminal device, indication information to the network device using a primary cell in a sending occasion after detecting within the time threshold the secondary cell by the terminal device, wherein the sending occasion includes a first sending occasion during the time threshold or a first sending occasion occurring after the time threshold;
   receiving, at the terminal device, a reference signal (RS) sent by the network device on the secondary cell, wherein the RS is triggered to be sent by the network device in response to the sending the indication information by the terminal device; and
   activating the secondary cell based on the RS.

2. The communication method according to claim 1, wherein the sending the indication information to the network device is not later than after a time threshold for detecting the secondary cell.

3. The communication method according to claim 1, wherein the receiving the configuration information further comprising:
   receiving first configuration information sent by the network device, wherein the first configuration information indicates a first resource for sending the indication information; and
   wherein the sending of the indication information to the network device comprises:
   sending the indication information to the network device by using the first resource indicated by the first configuration information.

4. The communication method according to claim 3, wherein the first resource indicated by the first configuration information is a resource for reporting layer 1 reference signal received power (L1-RSRP).

5. The communication method according to claim 1, wherein the indication information indicates a synchronization signal/physical broadcast channel block (SSB) index corresponding to a transmit beam recommended to be used by the network device, and a quantity of SSB indexes is equal to one.

6. The communication method according to claim 5, wherein the RS and a second SSB corresponding to the SSB index indicated by the indication information are quasi co-located (QCL).

7. The communication method according to claim 5, wherein the RS comprises the SSB, and the receiving the RS sent by the network device comprises:
   receiving the second SSB corresponding to the SSB index indicated by the indication information sent by the network device.

8. An apparatus, comprising:
   a processor; and
   a memory having instructions stored thereon that, in response to being executed by the processor, cause the processor to:
   receive configuration information from a network device, wherein the configuration information includes a time threshold for detecting a secondary cell by the terminal device;
   determine the secondary cell within the time threshold;
   send indication information to the network device using a primary cell in a sending occasion after detecting within the time threshold the secondary cell by the terminal device, wherein the sending occasion includes a first sending occasion during the time threshold or a first sending occasion occurring after the time threshold;
   receive a reference signal (RS) sent by the network device on the secondary cell, wherein the RS is triggered to be sent by the network device in response to the sending the indication information; and
   activate the secondary cell based on the RS.

9. The apparatus according to claim 8, wherein the processor is configured to send the indication information to the network device not later than after time threshold for detecting the secondary cell.

10. The apparatus according to claim 8, wherein the processor is further configured to receive the configuration information by receiving
first configuration information sent by the network device, wherein the first configuration information indicates a first resource for sending the indication information; and
wherein the sending of the indication information to the network device comprises:
sending the indication information to the network device by using the first resource indicated by the first configuration information.

11. The apparatus according to claim 10, wherein the first resource indicated by the first configuration information is a resource for reporting layer 1 reference signal received power (L1-RSRP).

12. The apparatus according to claim 8, wherein the indication information indicates a synchronization signal/physical broadcast channel block (SSB) index corresponding to a transmit beam recommended to be used by the network device, and a quantity of SSB indexes is equal to one.

13. The apparatus according to claim 12, wherein the RS and a second SSB corresponding to the SSB index indicated by the indication information are quasi co-located (QCL).

14. The apparatus according to claim 12, wherein the RS comprises the SSB, and the processor is further configured to receive the RS sent by the network device by:
receiving the second SSB corresponding to the SSB index indicated by the indication information sent by the network device.

15. An apparatus, comprising:
a processor; and
a memory having instructions stored thereon that, in response to being executed by the processor, cause the processor to:
send configuration information to a terminal device, wherein the configuration information includes a time threshold for detecting a secondary cell by the terminal device, wherein the secondary cell is to be determined by the terminal device within the time threshold;
receive indication information sent by a terminal device using a primary cell in a sending occasion after detecting within the time threshold the secondary cell by the terminal device, wherein the sending occasion includes a first sending occasion during the time threshold or a first sending occasion occurring after the time threshold; and
trigger sending a reference signal (RS) to the terminal device on a secondary cell in response to receiving the indication information.

16. The apparatus according to claim 15, wherein the instructions further cause the processor to send configuration information to the terminal device by:
sending first configuration information to the terminal device, wherein the first configuration information indicates a first resource for sending the indication information by the terminal device; and
wherein the processor is further configured to receive the indication information sent by the terminal device by:
receiving, on the first resource, the indication information sent by the terminal device.

17. The apparatus according to claim 16, wherein the first resource indicated by the first configuration information is a resource for reporting layer 1 reference signal received power (L1-RSRP) by the terminal device.

18. The apparatus according to claim 15, wherein the indication information indicates a synchronization signal/physical broadcast channel block SSB index corresponding to a transmit beam recommended to be used by a network device, and a quantity of SSB indexes is equal to one.

19. The apparatus according to claim 18, wherein the network device ensures that the RS and a second SSB corresponding to the SSB index indicated by the indication information are quasi co-located (QCL).

20. The apparatus according to claim 18, wherein the RS comprises the second SSB, and the processor is further configured to send the RS to the terminal device by using the secondary cell in response to the indication information by:
sending, to the terminal device by using the secondary cell in response to the indication information, the second SSB corresponding to the SSB index indicated by the indication information.

* * * * *